United States Patent [19]

Barkhurst

[11] Patent Number: 5,434,898

[45] Date of Patent: Jul. 18, 1995

[54] NUCLEAR FUEL ASSEMBLY

[75] Inventor: David J. Barkhurst, Pasco, Wash.

[73] Assignee: Siemens Power Corporation, Richland, Wash.

[21] Appl. No.: 212,443

[22] Filed: Mar. 14, 1994

[51] Int. Cl.⁶ .............................................. G21C 3/352
[52] U.S. Cl. .................................... 376/438; 376/442; 376/444
[58] Field of Search ................ 376/438, 441, 442, 444

[56] References Cited

U.S. PATENT DOCUMENTS

| | | | |
|---|---|---|---|
| 3,423,287 | 1/1969 | Anthony et al. | 376/442 |
| 3,719,560 | 3/1973 | Mayers et al. | 376/442 |
| 3,813,288 | 5/1974 | Leaver et al. | 376/442 |
| 3,824,153 | 7/1974 | Leaver et al. | 376/442 |
| 4,090,918 | 5/1978 | Masetti | 376/442 |
| 4,297,170 | 10/1981 | Leclercq | 376/442 |
| 4,351,795 | 9/1982 | Nicholson | 376/442 |
| 4,705,663 | 11/1987 | Steven et al. | 376/442 |
| 4,708,845 | 11/1987 | Mildrum et al. | 376/442 |
| 4,775,509 | 10/1988 | Noailly et al. | 376/442 |
| 4,933,138 | 6/1990 | Mouesca et al. | 376/442 |
| 5,032,351 | 7/1991 | Johansson | 376/438 |
| 5,188,798 | 2/1993 | Okuyama et al. | 376/442 |

Primary Examiner—Daniel D. Wasil
Attorney, Agent, or Firm—Ira Lee Zebrak

[57] ABSTRACT

A nuclear fuel assembly for a boiling water reactor having a spacer grid for positioning and retaining the fuel rods. The spacer grid comprising an upper grid structure and a lower grid structure. Each grid structure comprises a first set of grid strips and a second set of grid strips which intersect to form in each grid structure a lattice of rectangular and square shaped cells through which the fuel rods extend and which act against the fuel rods within the cells. The lattice in each of the upper grid structure and the lower grid structure being the same. The upper grid structure and the lower grid structure being oriented relative to one another so that each of the rectangular and square shaped cells in the upper grid structure is superimposed on a corresponding one of the rectangular and square shaped cells in the lower grid structure so as to act cooperatively against and provide support to a fuel rod on four sides of the fuel rod.

22 Claims, 20 Drawing Sheets

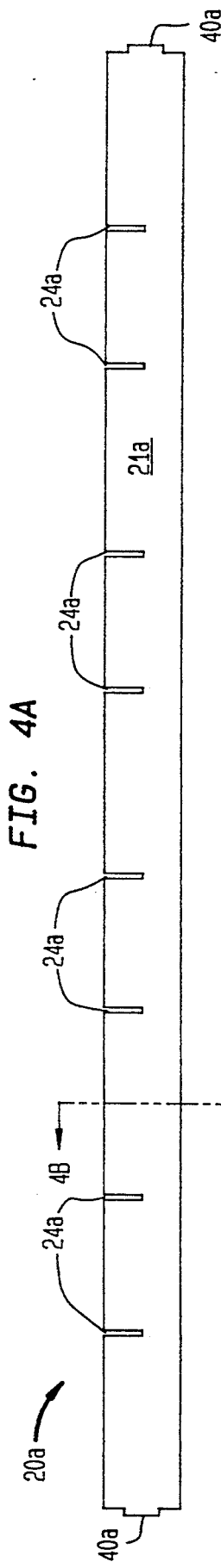
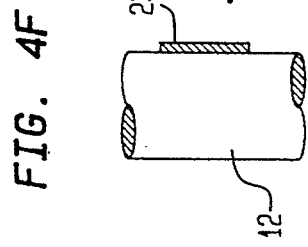
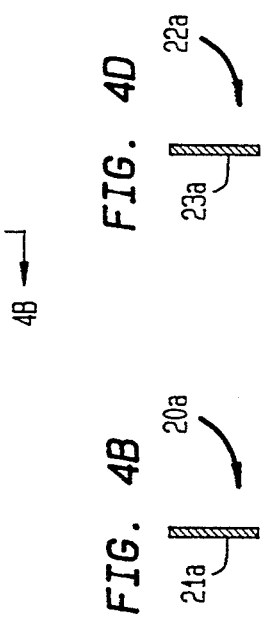
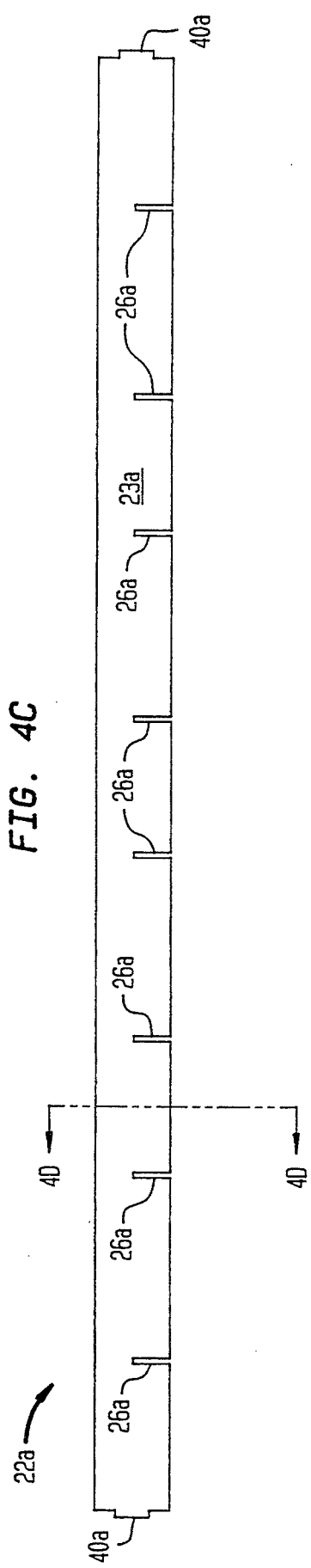

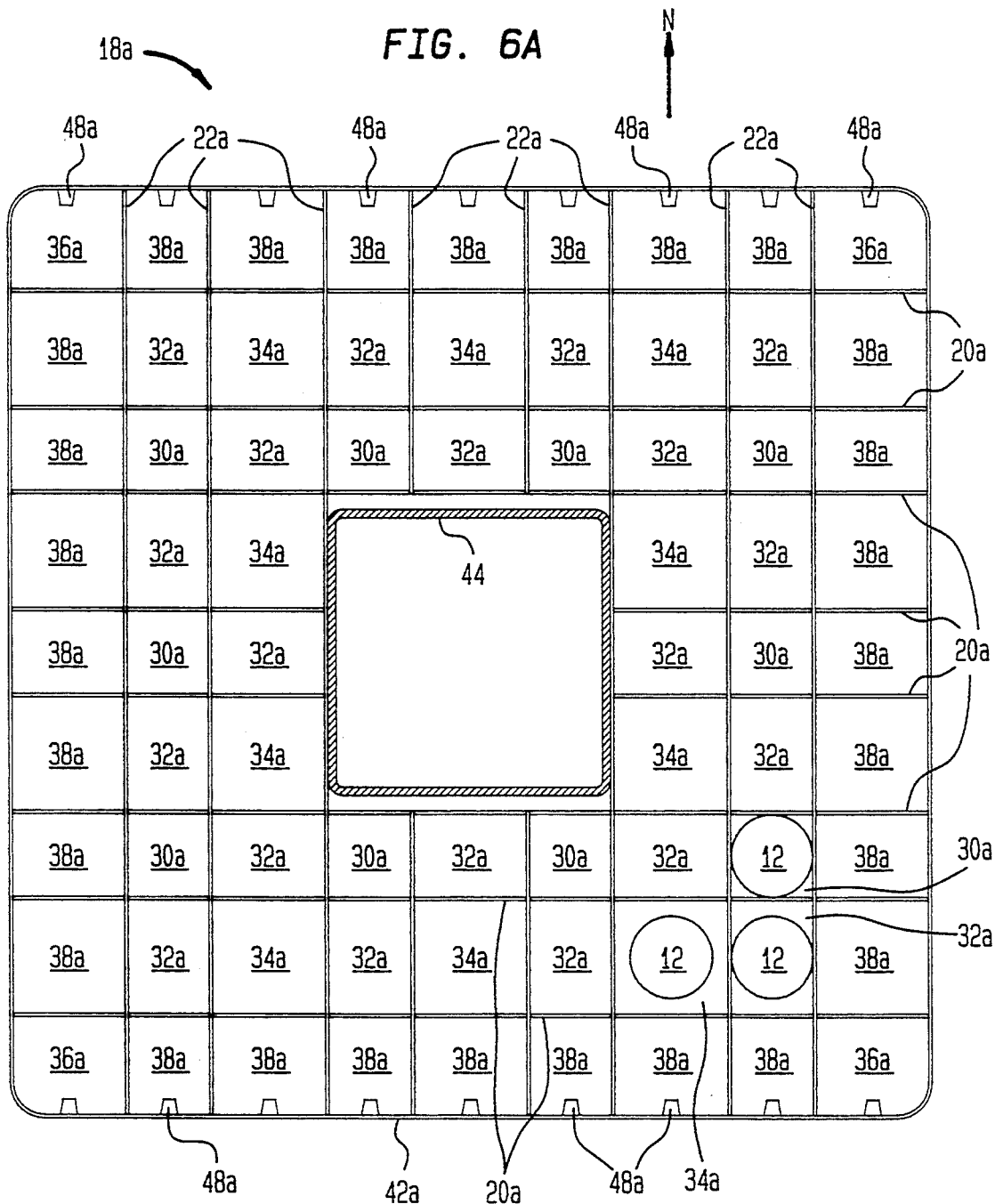

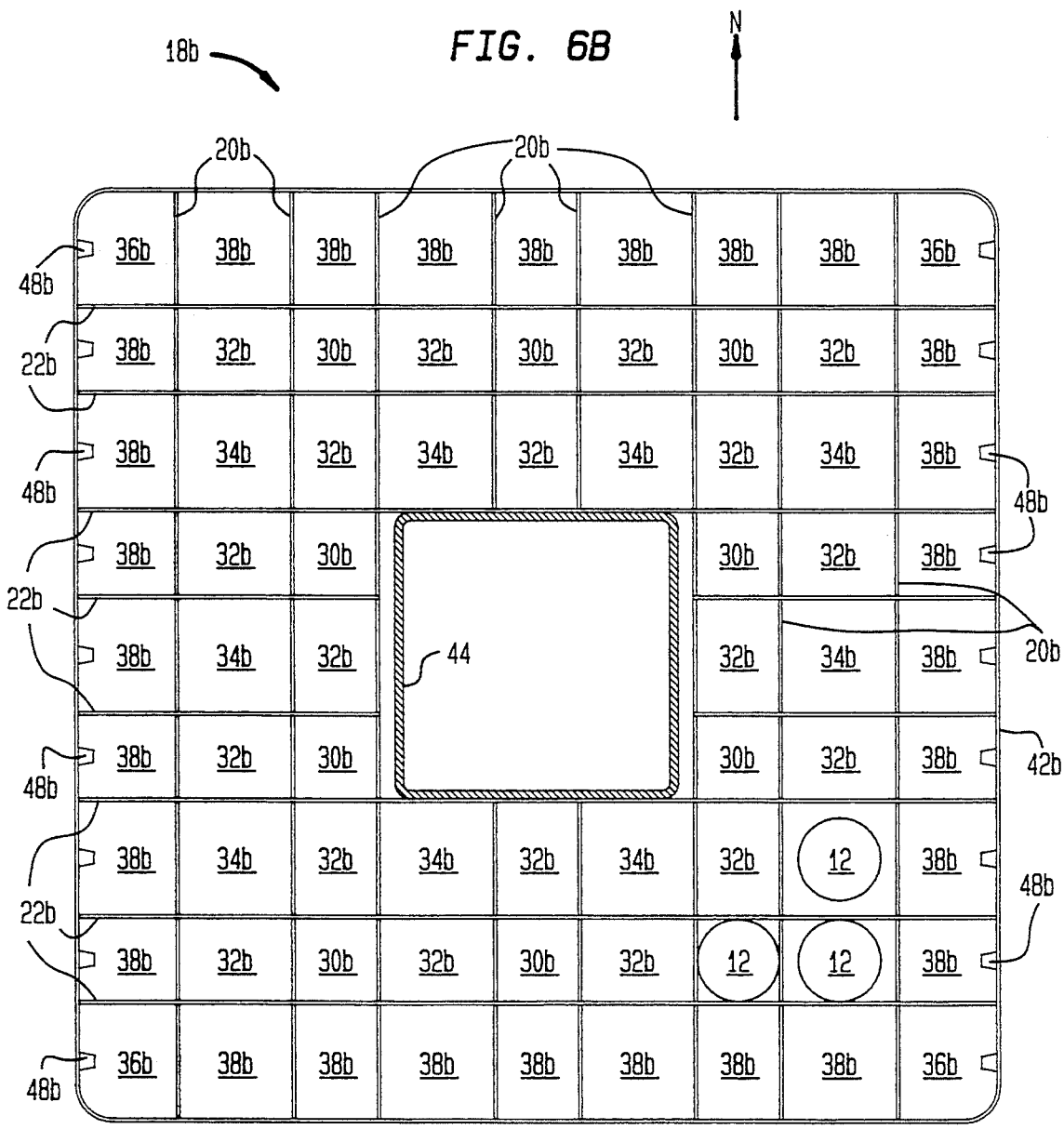

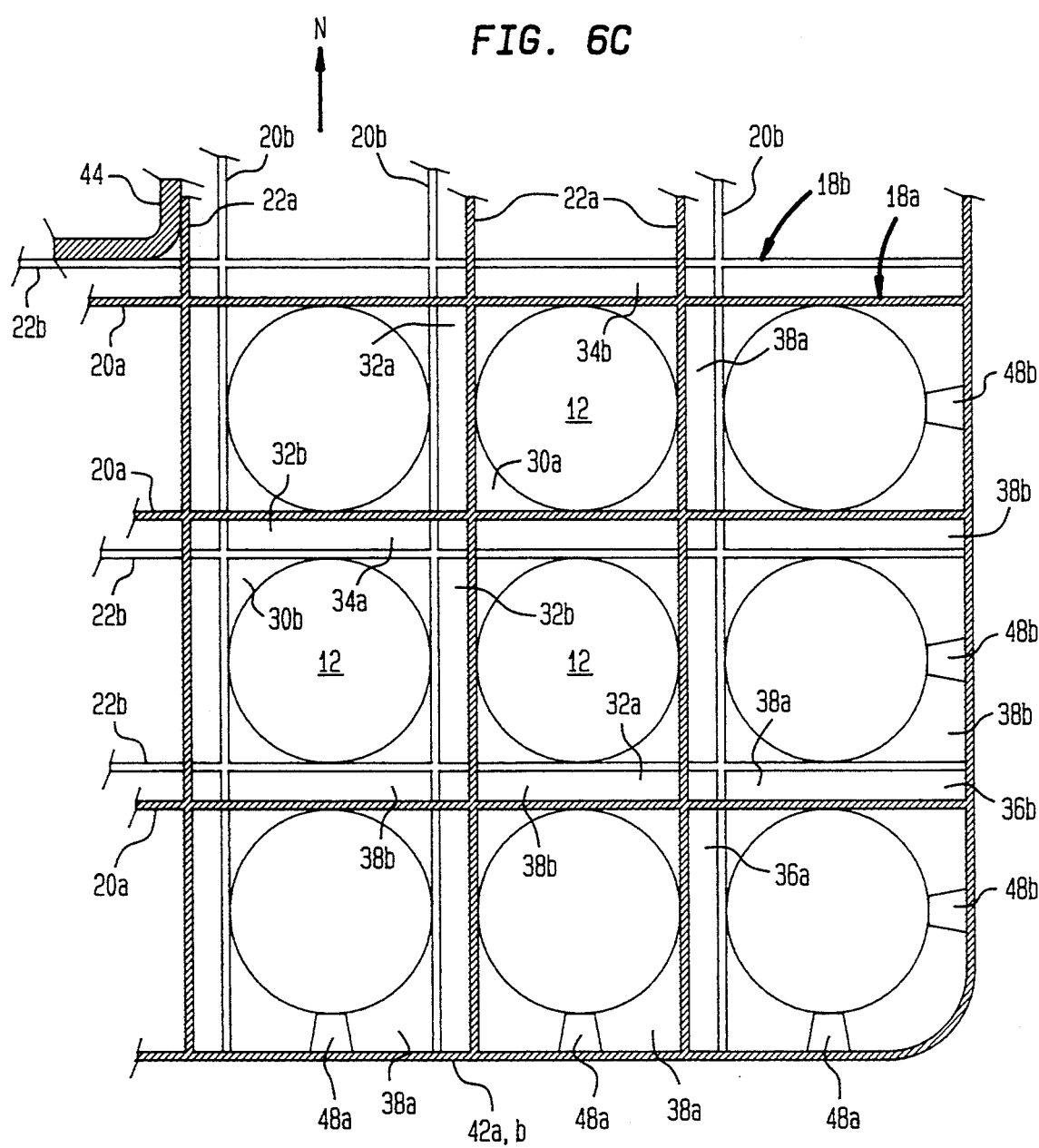

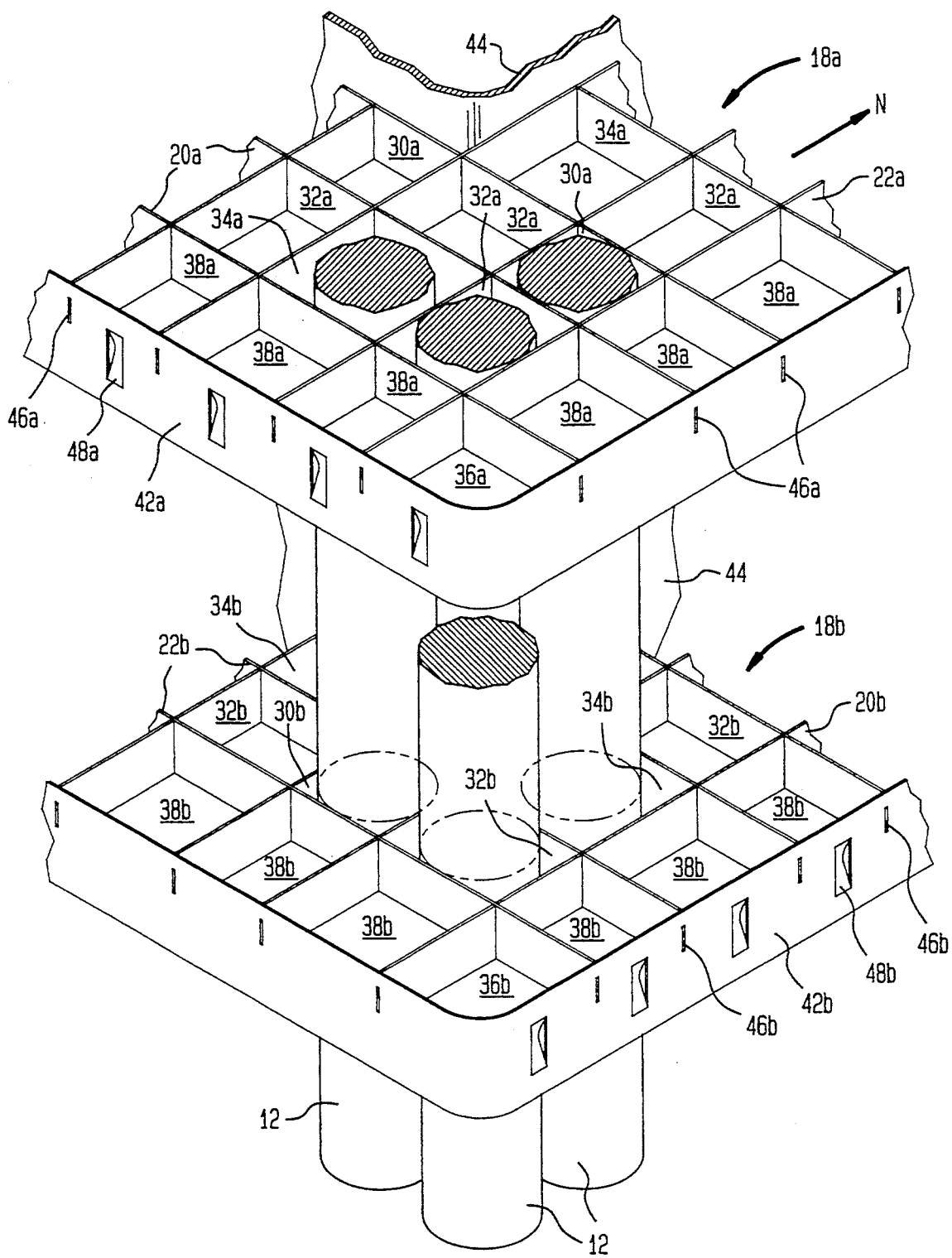

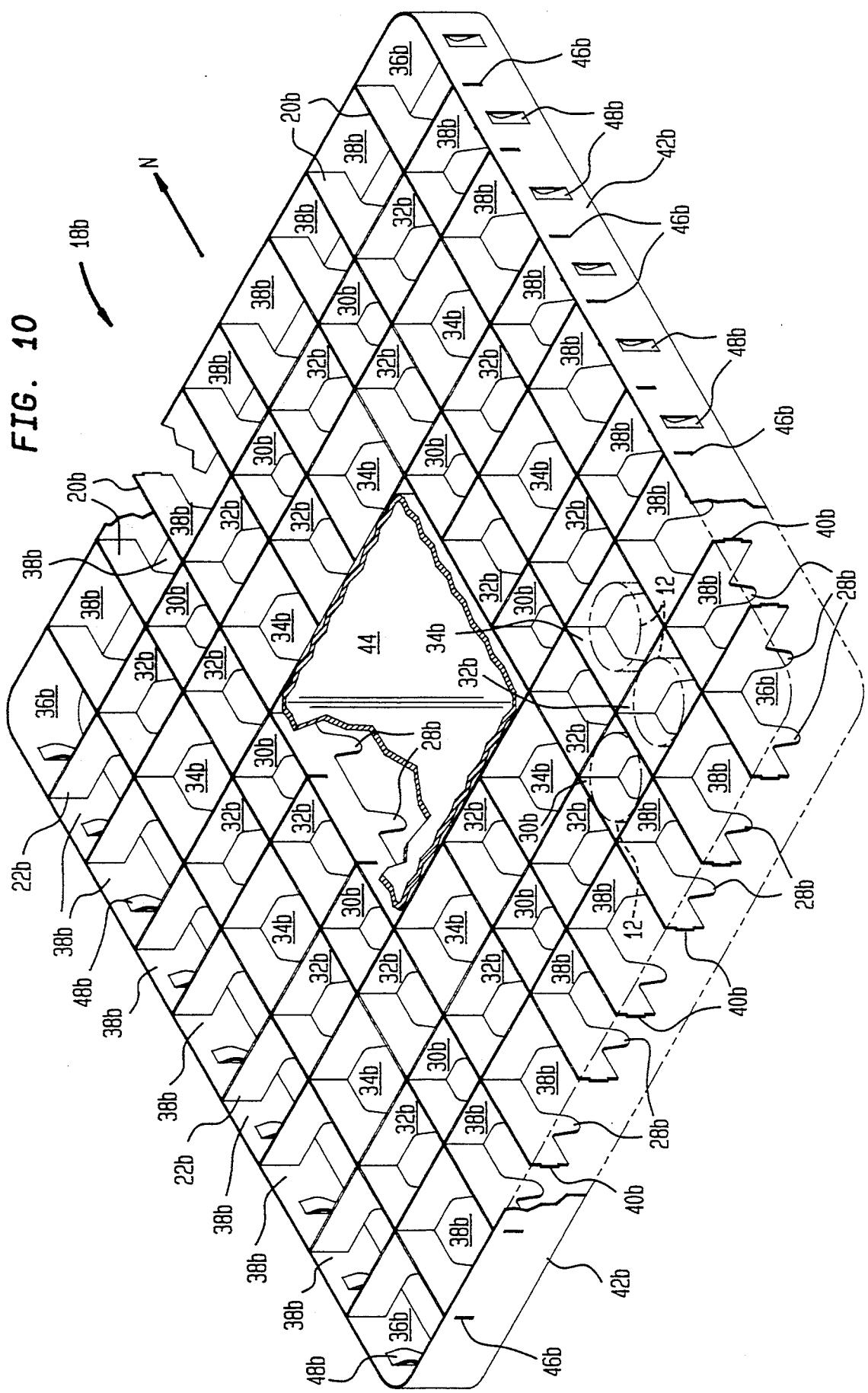

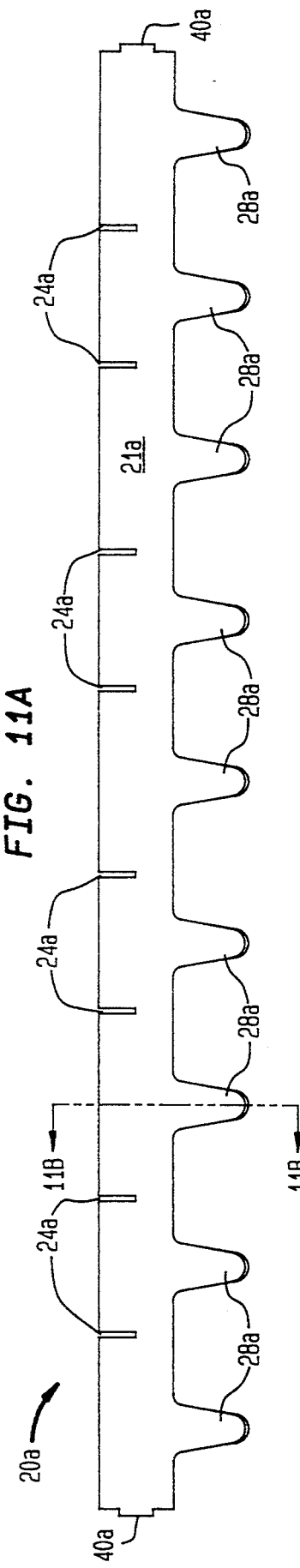
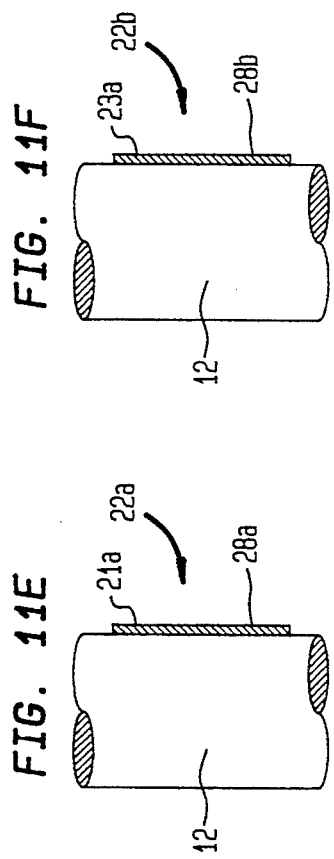
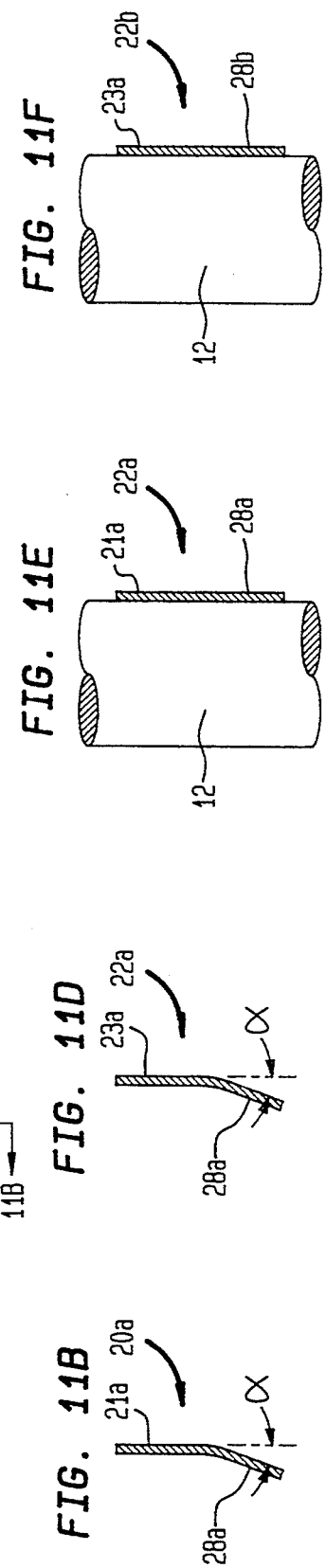
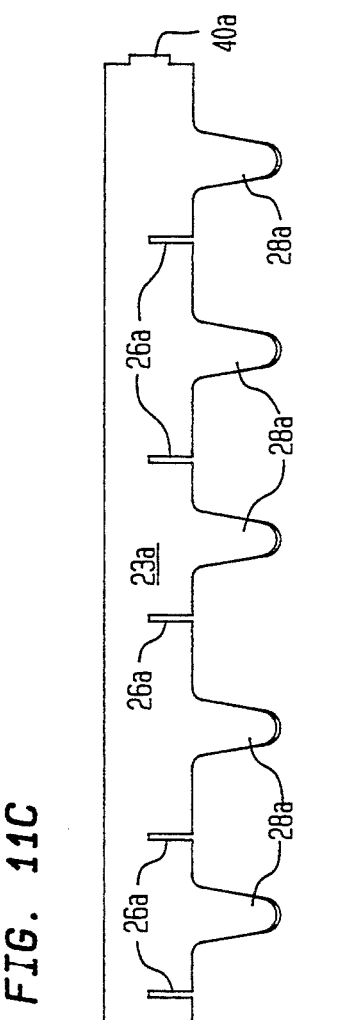
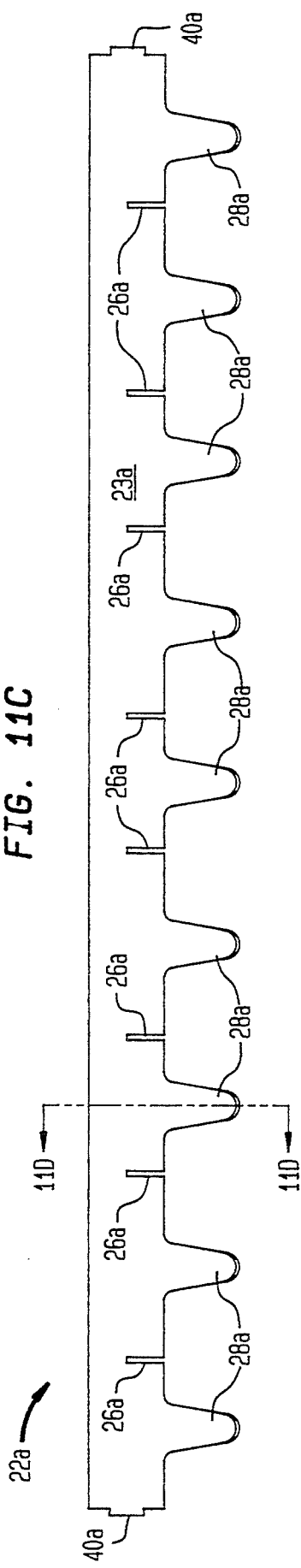

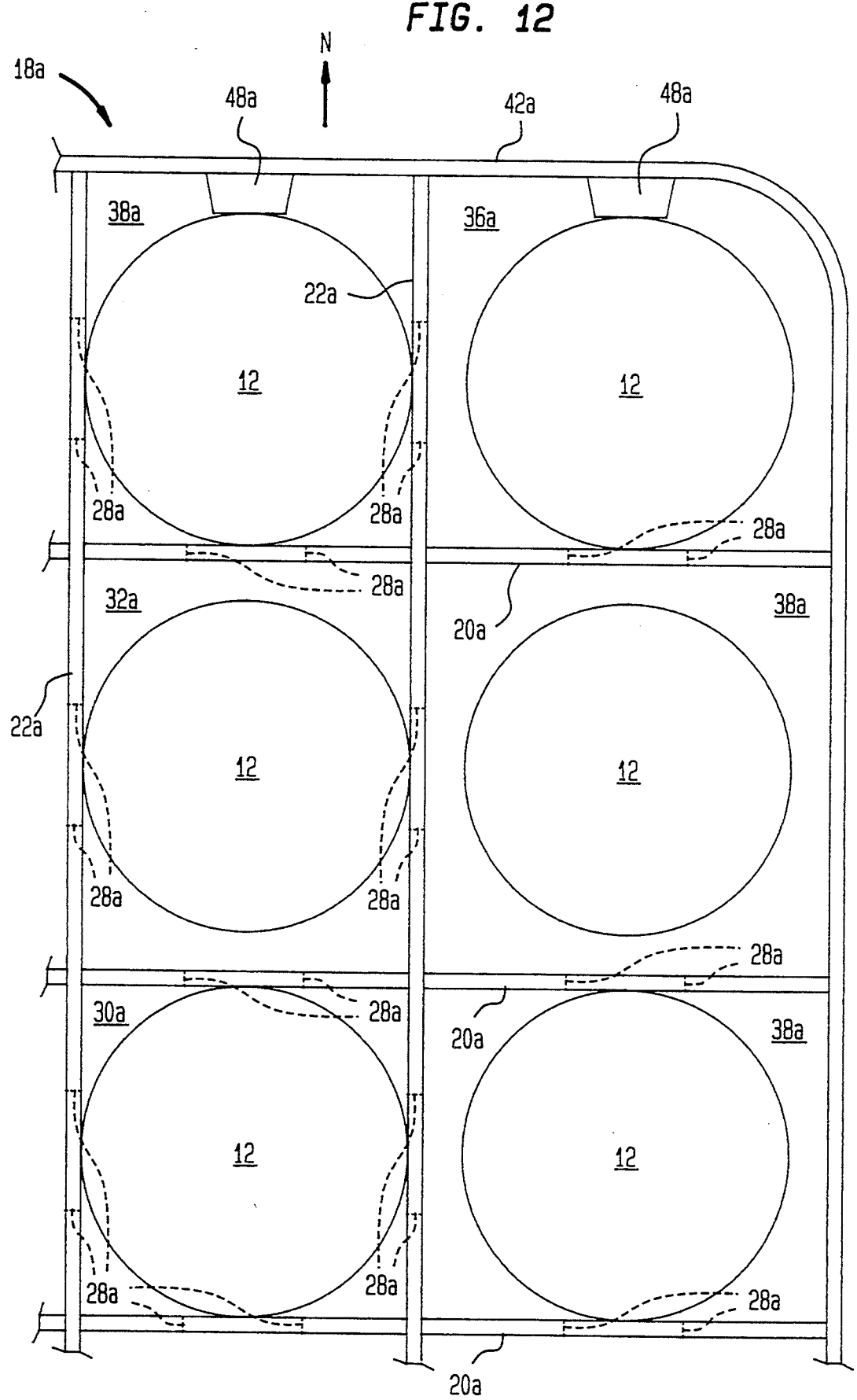

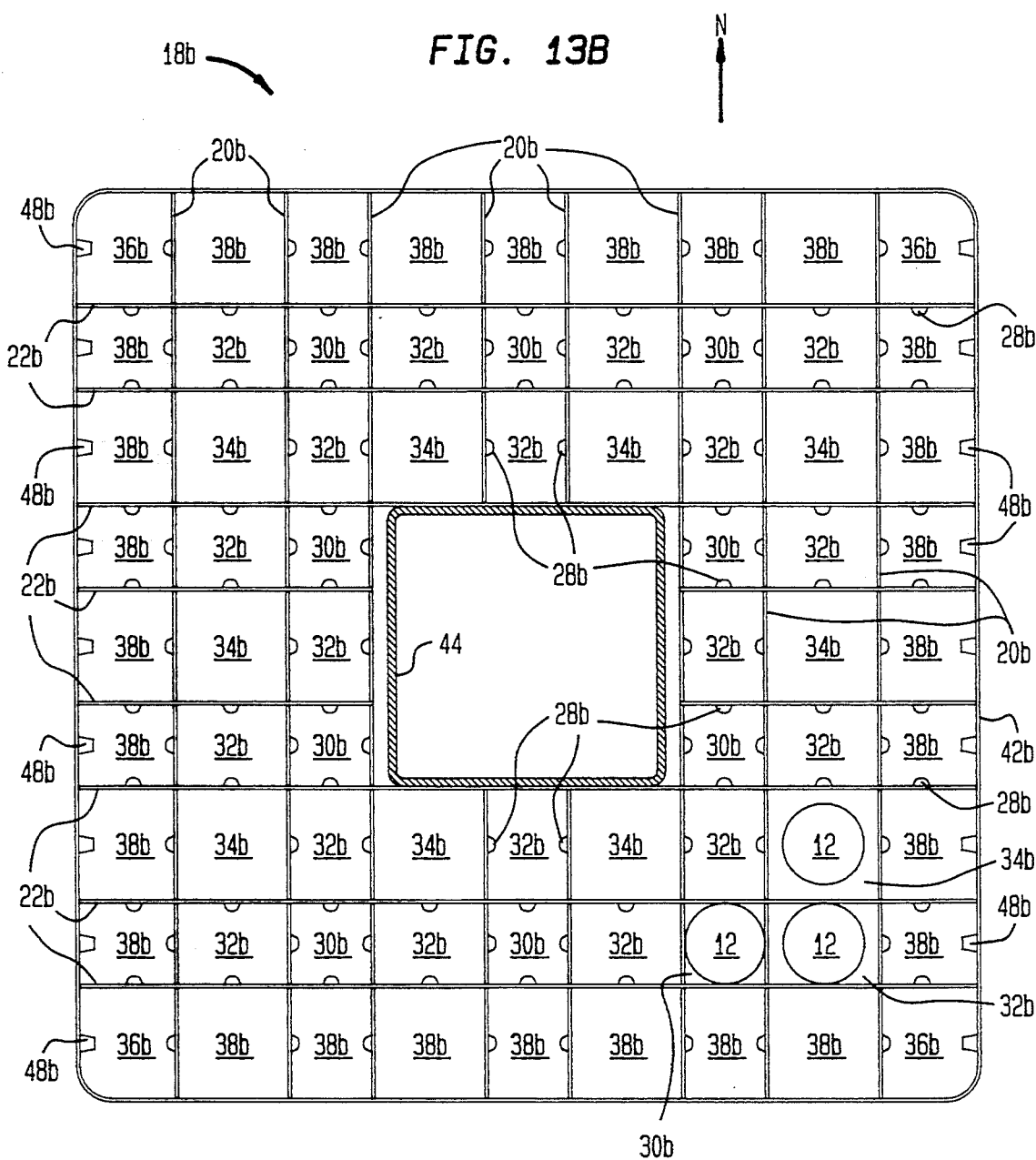

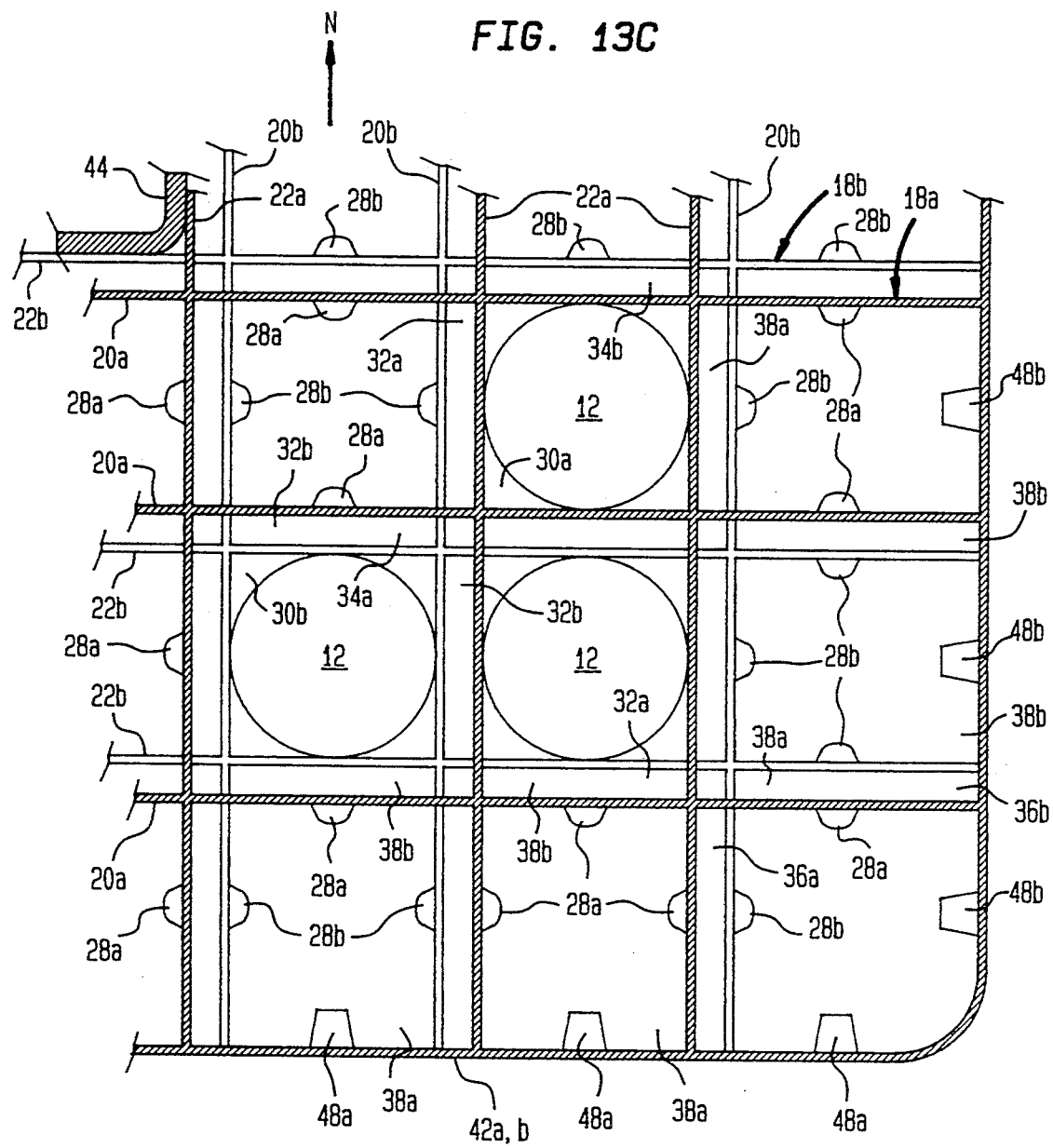

NUCLEAR FUEL ASSEMBLY

BACKGROUND OF THE INVENTION

This invention relates to fuel assemblies for nuclear reactors, and more particularly to nuclear fuel rod spacers or spacer grids which are usually placed at predetermined distance(s) along the length of the fuel assembly in order to provide lateral bracing and spacing, and to maintain the nuclear fuel rods in fixed positions.

In a nuclear reactor, the reactor core contains nuclear fuel which is typically in the form of fuel rods grouped together in fuel assemblies. Groups of fuel assemblies are arranged into a matrix to form a core capable of controlled fission reaction.

Each fuel rod is typically a long member approximately 0.4 inches in diameter and 8 to 15 feet long containing fuel usually in the form of a stack of fuel pellets which are surrounded by tubular cladding. The fuel rods which make up an assembly are grouped together to form a plurality of longitudinally extending members which are supported by two parallel end plates, an upper and a lower tie plate. These plates are usually also connected to one another by tie rods, or other structural elements.

Each fuel assembly or bundle may also include nonfuel bearing members. Examples include guide tubes to form passageways for control rods which assist in controlling the rate of fission, instrumentation tubes for in-core instrumentation, spacer capture rods, and water rods to modify the neutron moderation in the assembly. The spaces between adjacent fuel rods create flow channels through which coolant and/or moderator can circulate. In light water reactors, the coolant and moderator is water. Lateral bracing and spacing of the fuel rods in the fuel assembly are provided by spacers or spacer grids.

The fuel assembly or bundle, whether in a pressurized water reactor, boiling water reactor, high temperature gas cooled reactor, or any other type of reactor, functions in part to maintain the fuel rods in a fixed position, ideally free of vibration and restrained from bowing or other lateral displacement during normal and other operating conditions. In addition, by maintaining the fuel rods in fixed positions, proper cooling and neutron moderation can be achieved. Devices that assist in maintaining the fuel rods in fixed positions in the fuel assembly or bundle and which thereby facilitate proper fuel cooling are spacers.

Spacers or spacer grids which provide lateral bracing are typically designed to allow differential axial expansion of the fuel rods. Springs incorporated in the spacer grids are most frequently used to permit some sliding of the fuel rods with respect to the spacer grids. In some of the designs, the spacer grid is free to move axially a small amount to accommodate minor changes in the axial length of the fuel rods during irradiation.

If spacers were to be rigidly connected to the fuel rods as well as to structural members of the fuel assembly, then relative axial movement due to rod growth and thermal expansion of adjacent rods can cause local fuel rod skewing and bowing.

By being positioned at regular intervals, spacers maintain rod-to-rod spacing along the length of the fuel assembly. Spacers are typically made of zirconium based alloy sheet material or sometimes from Inconel or stainless steel, and are built up from a relatively large number of different intricately shaped strips that are fitted together by hand and subsequently welded or brazed. The spacers generally have an egg crate shape and each spacer cell includes features such as dimples and/or springs to maintain the desired rod-to-rod spacing. Sometimes, short sections of tubing are used that are welded to one another along parts of their edges. Thus, the springs and dimples keep the fuel rods in their proper lateral positions. But, under the influence of radiation, undesirable changes in fuel rod pitch (i.e. rod-to-rod spacing) can occur which may cause gaps or spaces to develop between fuel rods and the spacers, and increase the likelihood that the rods and/or spacer grids will vibrate. Such gaps, changes in fuel rod pitch, and vibration may lead to fuel rod fretting and failure. Furthermore, as the fuel is irradiated, the fuel rods undergo a shrinkage or diameter reduction known as "creepdown" which can result in gaps between the fuel rod cladding and the spacer which in turn can cause or contribute to fuel rod fretting.

Spacers should be thin members and have minimal cross-sectional area. Ideally, they are invisible to moderator and coolant flow while providing required lateral strength. Spacer designs reduce flow area and, also increase flow resistance and restrict coolant flow causing undesirable pressure drops. Thus, the particular physical configuration of a spacer can create or contribute to local or even non-local undesirable flow redistribution, restriction, or distortion.

Typically, the fabrication of spacers requires extensive labor in shaping the separate parts and in assembling and welding these parts to form a spacer grid. Many of these operations can be automated. However, even with automated spacer fabrication, assembly and joining, high manufacturing cost and inspection costs result from complex designs.

It would be an advantage if the effective coolant flow area surrounding each fuel rod is maximized by minimizing the spacer cross sectional surface area which impedes coolant flow.

It would be a further advantage if the assembly of the spacer was simplified by the spacer design itself.

It would be an additional further advantage if a spacer having each of the above advantages could be fabricated, tested and inspected at a lower cost than conventional spacers and at the same time improve overall quality and reliability.

SUMMARY OF THE INVENTION

These and other objects of the invention are achieved by providing a nuclear fuel assembly having a spacer for positioning and restraining nuclear fuel rods, the spacer comprising an upper grid structure and a lower grid structure, each of the lower grid structure and the upper grid structure comprises: a first set of flat substantially straight parallel grid strips, a second set of flat substantially straight parallel grid strips which intersect the first set of grid strips to form a lattice of rectangular shaped cells through which the fuel rods extend and which act against said fuel rods within the cells, a perimeter strip which extends around the perimeter of the intersecting first and second grid strips, the first grid strips and the second grid strips being secured to the perimeter strip, the perimeter strip having a plurality of dimples; the lower grid structure and upper grid structure being positioned parallel to one another and oriented substantially 90° relative to one another so that each of the rectangular shaped cells in the upper grid structure is superimposed on a corresponding one of the rectangular shaped cells in the lower grid structure so as to act cooperatively against and provide support to a nuclear fuel rod positioned in the cell in the upper grid structure and in the corresponding cell in the lower grid structure on four sides of the nuclear fuel rod.

BRIEF DESCRIPTION OF THE DRAWINGS

The foregoing and other features of the invention will be more readily apparent from the following detailed description and drawings of illustrative embodiments of the invention in which:

FIG. 4a is a side view of one of the grid strips forming part of the upper grid structure;

FIG. 4b is a sectional view of the grid strip shown in FIG. 4a taken along line 4b—4b;

FIG. 4c is a side view of the second grid strip forming part of the upper grid structure;

FIG. 4d is a sectional view of the grid strip shown in FIG. 4c taken along line 4d—4d;

FIGS. 4e and 4f are side views and show a fuel rod in its loaded position in the spacer grid supported by a grid strip;

FIG. 5b is a sectional view taken along line 5b—5b of a support dimple shown in FIG. 5a;

FIG. 6a is a sectional view taken along line 6a—6a of FIG. 1 of upper grid structure of the fuel rod spacer grid;

FIG. 6b is a sectional view taken along line 6b—6b in FIG. 1 looking down on to the lower grid structure of the fuel rod spacer grid;

FIG. 6c is a sectional view along line 6c—6c in FIG. 1 looking down showing the superposition of a portion of the upper grid structure upon a corresponding portion of the lower grid structure;

FIG. 6d is a perspective view of a portion of the spacer grid showing the support of several fuel rods within their fuel rod support cells in both the upper and lower grid structures;

FIG. 10 is a perspective fragmentary view looking down upon the alternative spacer assembly in FIG. 8 showing the lower grid structure which includes cantilever spring tabs;

FIG. 11a is a side view of one of the grid strips of the upper grid structure of the alterative spacer shown in FIG. 8;

FIG. 11b is a sectional view of the grid strip shown in FIG. 11a taken along line 11b—11b;

FIG. 11c is a side view of the second grid strip of the upper grid strip of the alternative spacer shown in FIG. 8;

FIG. 11d is a sectional view of the grid strip shown in FIG. 11 taken along line 11d—11d;

FIG. 11e and 11f are side views and show a fuel rod in its loaded position in the spacer grid, supported by grid strips and cantilevered spring tabs extending from the supporting grid strips;

FIG. 12 is a top view of the upper grid structure taken along lines 12—12 of FIG. 9 showing a portion of the upper grid structure including a corner and peripheral fuel rod support cells and cantilevered spring tabs;

FIG. 13b is a sectional view taken along line 13b—13b of the alternative embodiment in FIG. 8 showing the lower grid structure;

FIG. 13c is a sectional view taken along line 13c—13c of the alternative embodiment in FIG. 8 looking down showing the superposition of a portion of the upper grid structure upon a corresponding portion of the lower grid structure.

DESCRIPTION OF ILLUSTRATIVE EMBODIMENTS

Figure 1:
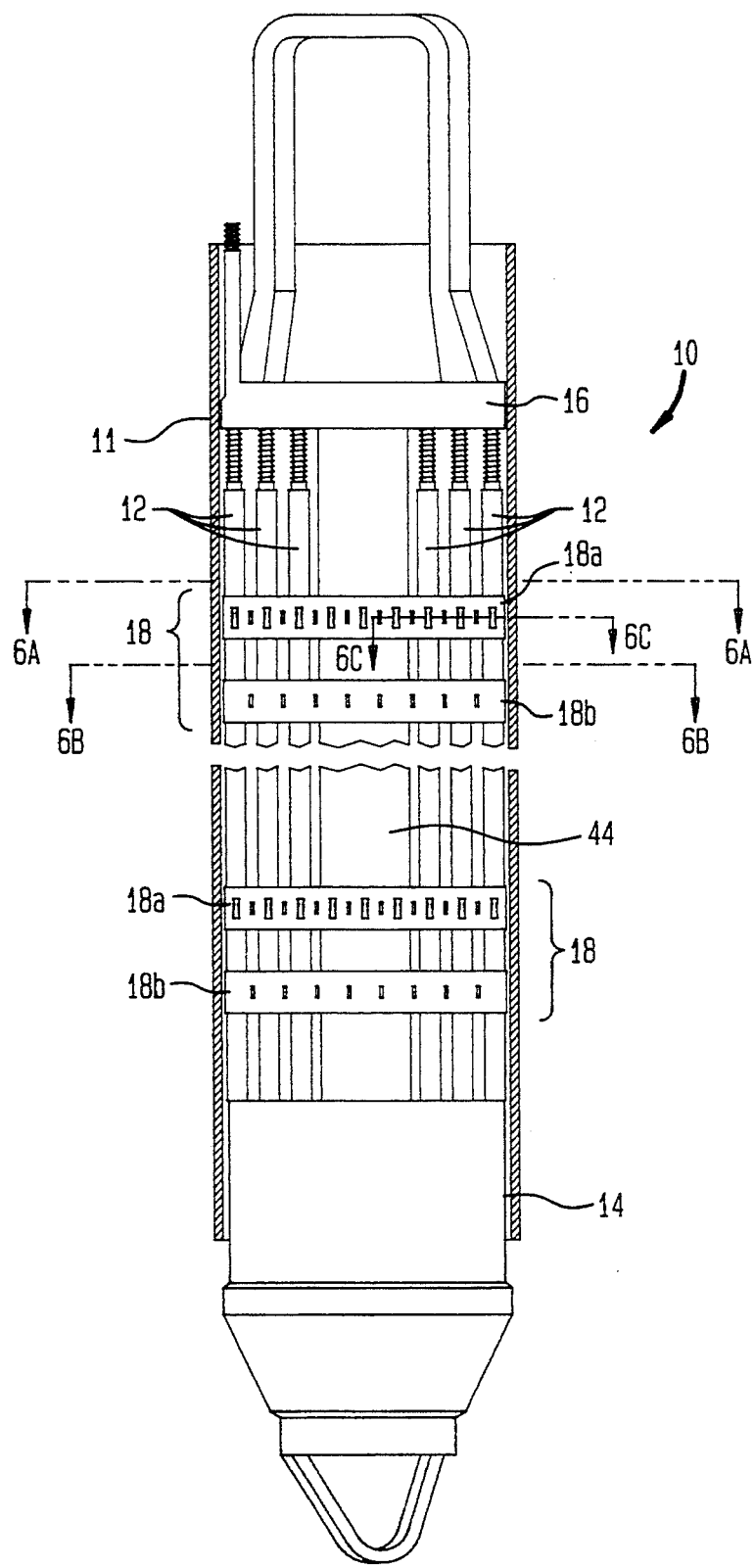
FIG. 1 is a sectional view along the length of a boiling water reactor fuel assembly employing the spacer of the present invention.

Referring to FIG. 1, a boiling water reactor fuel assembly having a 9×9 fuel rod array is generally shown at 10 having elongated fuel rods 12 containing nuclear fuel pellets. The fuel rods are supported between a lower tie plate 14 and upper tie plate 16. Fuel rods 12 pass through simplified spacer grids 18 of the present invention, only two of which are shown in this fragmentary view. Simplified spacer grids 18 provide intermediate support of rods 12 over the length of fuel assembly 10 and maintain them in a spaced relationship while restraining them from lateral displacement. Each simplified grid spacer 18 includes two grid structures, an upper grid structure 18a and a lower grid structure 18b. The upper and lower grid structures 18a, 18b are mechanically identical but are positioned parallel to one another and oriented 90° relative to one another within the fuel assembly as will be more fully discussed below. An inner water channel 44 is at the center of the array of fuel rods 12. Inner channel 44 replaces the innermost three by three array of fuel rods. Outer channel 11 is shown around the fuel rods 12 and spacers 18. Although reference is made in the specification to a 9×9 fuel rod array, such an array has been selected for illustrative purposes only. It will be readily understood by those skilled in the art that the present invention can be used with any type of BWR fuel assembly or any fuel rod array not just the one shown in FIG. 1. The present invention can be used with other arrays including, but not limited to 8×8, 10×10 and 11×11, as well as those in which fuel rods are replaced by part length fuel rods, water rods/tubes/channels as well as other non-fuel bearing components.

Figure 2:
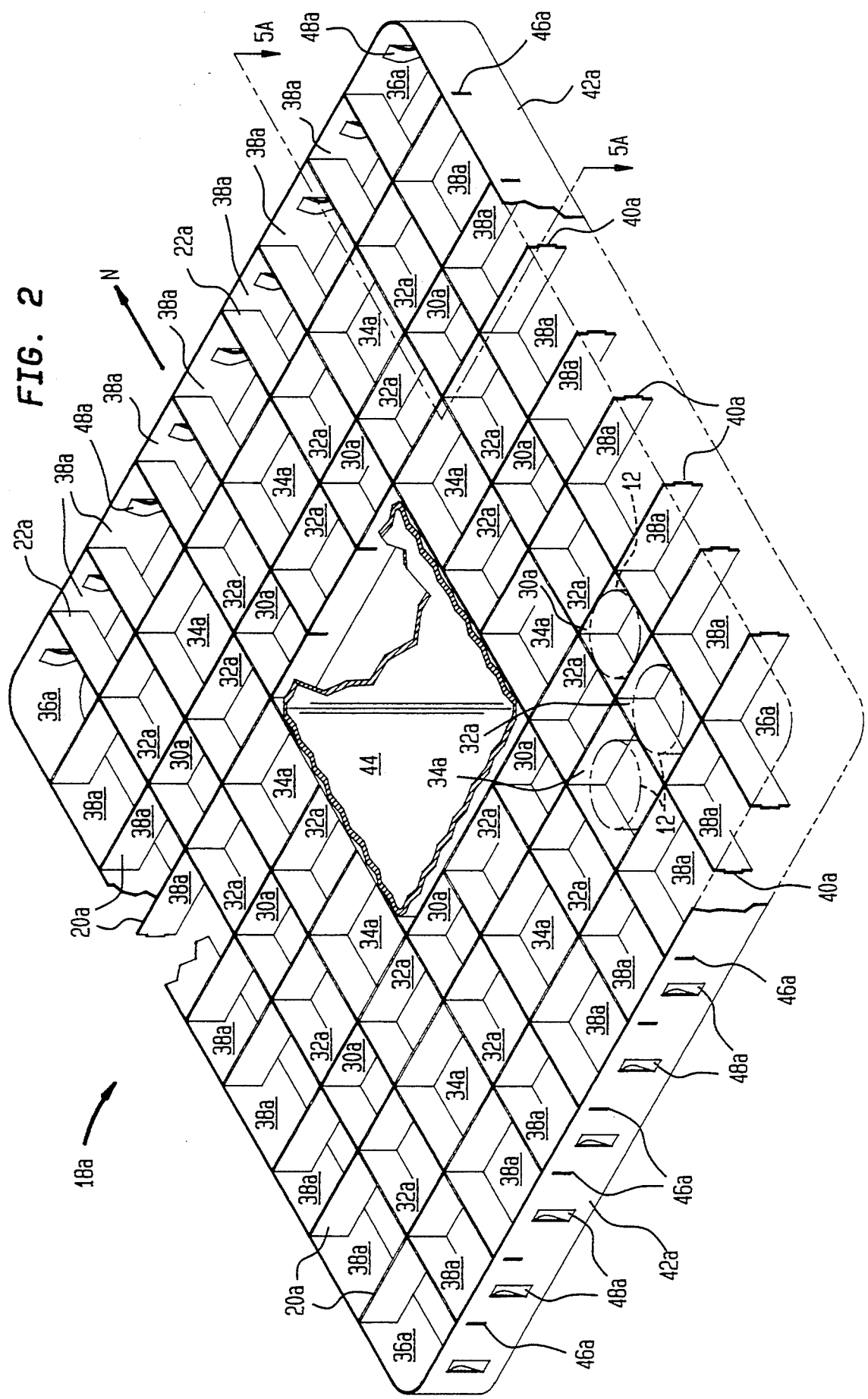
FIG. 2 is a perspective fragmentary view looking down upon the upper grid of the spacer shown in FIG. 1 but with the fuel rods, inner water channel and outer channel removed.
Figure 3:
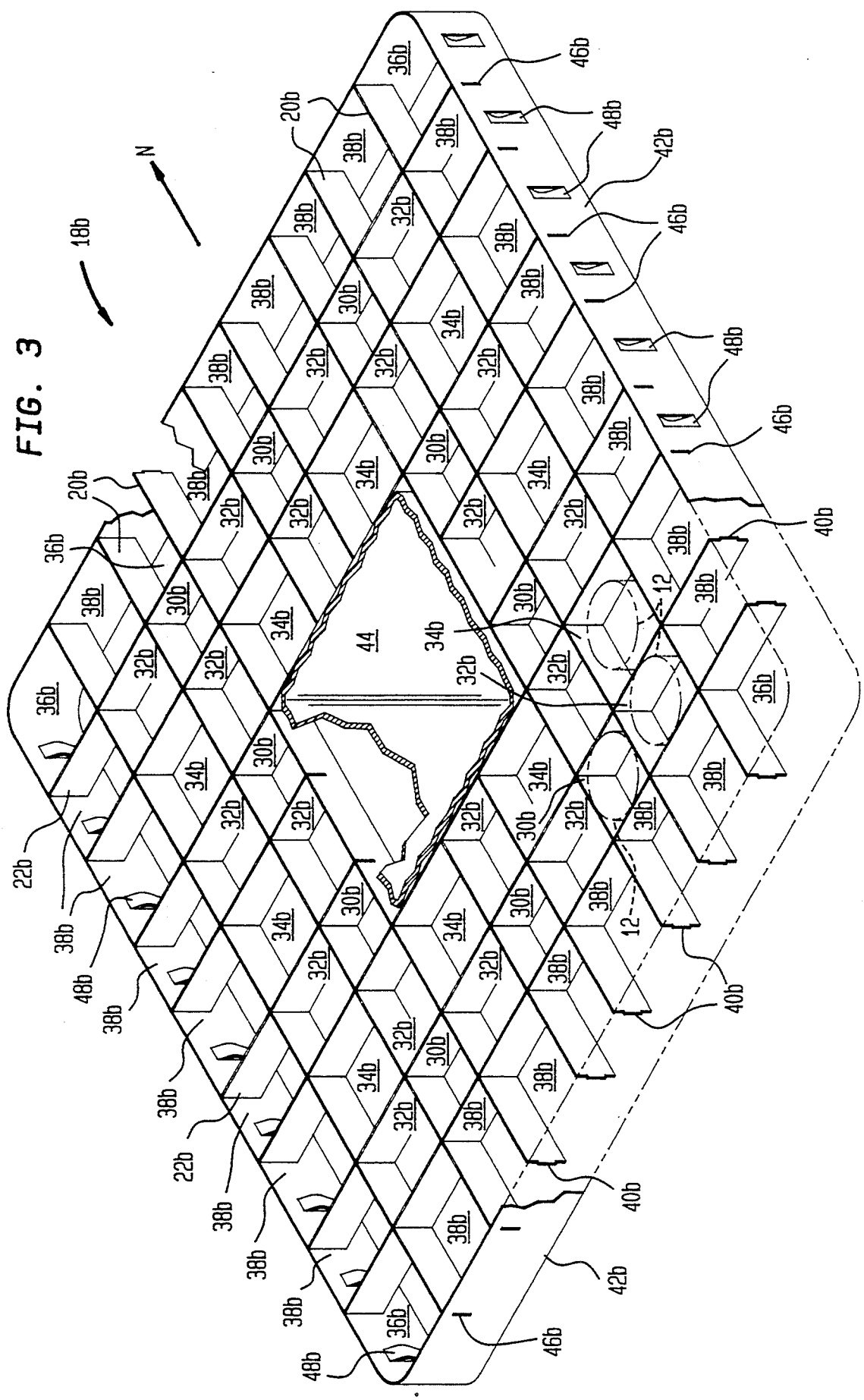
FIG. 3 is a perspective fragmentary view looking down upon the lower grid structure with most of the fuel rods as well as the outer channel removed.

FIG. 2 is a perspective fragmentary view looking from the side and down upon upper grid structure 18a of one of the spacer grids 18, with outer channel 11 removed, and inner water channel 44 partially removed. All of the fuel rods except three have been removed and these three fuel rods have been shortened for clarity of illustration.

Each of the upper 18a and lower 18b grid structures of spacer grid 18 is composed of two sets of parallel grid strips. Reference is made to FIG. 2 which shows upper grid structure 18a which is formed by the intersection of grid strips 20a and 22a. Each one of grid strips 20a and grid strips 22a is made of a flat narrow straight strip as shown in FIGS. 4a and 4c, respectively. Grid strips 20a and 22a are provided with notches 24a and 26a, respectively, which interfit when the grid strips 20a and 22a are assembled to form a lattice of rectangular shaped openings or cells 30a, 32a, 34a. A fuel rod extends through each of these cells 30a, 32a, or 34a. The strips 20a, 22a may be welded or otherwise fixed together at their intersections at the upper or lower edge, or both, or the welding or affixing may be omitted. Each end of each grid strip 20a and 22a has a prong 40a which is shaped to fit into a matching recess 46a in a perimeter strip 42a which extends around the perimeter of the set of intersecting grid strips 20a and 22a. The portions of grid strips 20a and 22a making up the nine centermost cells are removed as shown in FIG. 2 in order to connect to inner water channel 44.

Fuel rod support cell 30a has a square cross-sectional area. The inside width of each side wall of the support cell 30a corresponds to the outer diameter of the fuel rod. Each sidewall of cell 30a contacts and thereby supports the fuel rod.

Fuel rod support cell 32a has a rectangular cross-sectional area. The inside width of support cell 32a also corresponds to the outside diameter of the fuel rod. The longer inside walls of cell 32a contact and thereby support the fuel rod. The shorter wall of support cell 32a does not contact the outside diameter of the fuel rod.

Cell 34a has a square cross-sectional area and is created by the walls of the four rectangular cells 32a which surround it. Each wall of cell 34a is larger than the outside diameter of the fuel rod and thus does not contact the fuel rod which passes through cell 34a.

As shown in FIG. 2, and FIG. 6a which is a sectional view of upper grid structure 18a with most of the fuel rods removed for clarity of illustration, each fuel rod support cell 30a supports the fuel rod passing through it on four sides, while fuel rod support cell 32a supports the fuel rod passing through it on two sides each being on opposite sides of the cell. Cell 34a does not support the fuel rod but permits it to pass through the cell untouched. The fuel rods which pass through cells 32a and 34a and are thereby not supported on all four sides in the upper grid structure 18a, are respectively supported within support cells 32b and 30b of lower grid structure 18b so that the fuel rod in each of these cells is supported on all four sides by each spacer grid 18.

Figure 5A:
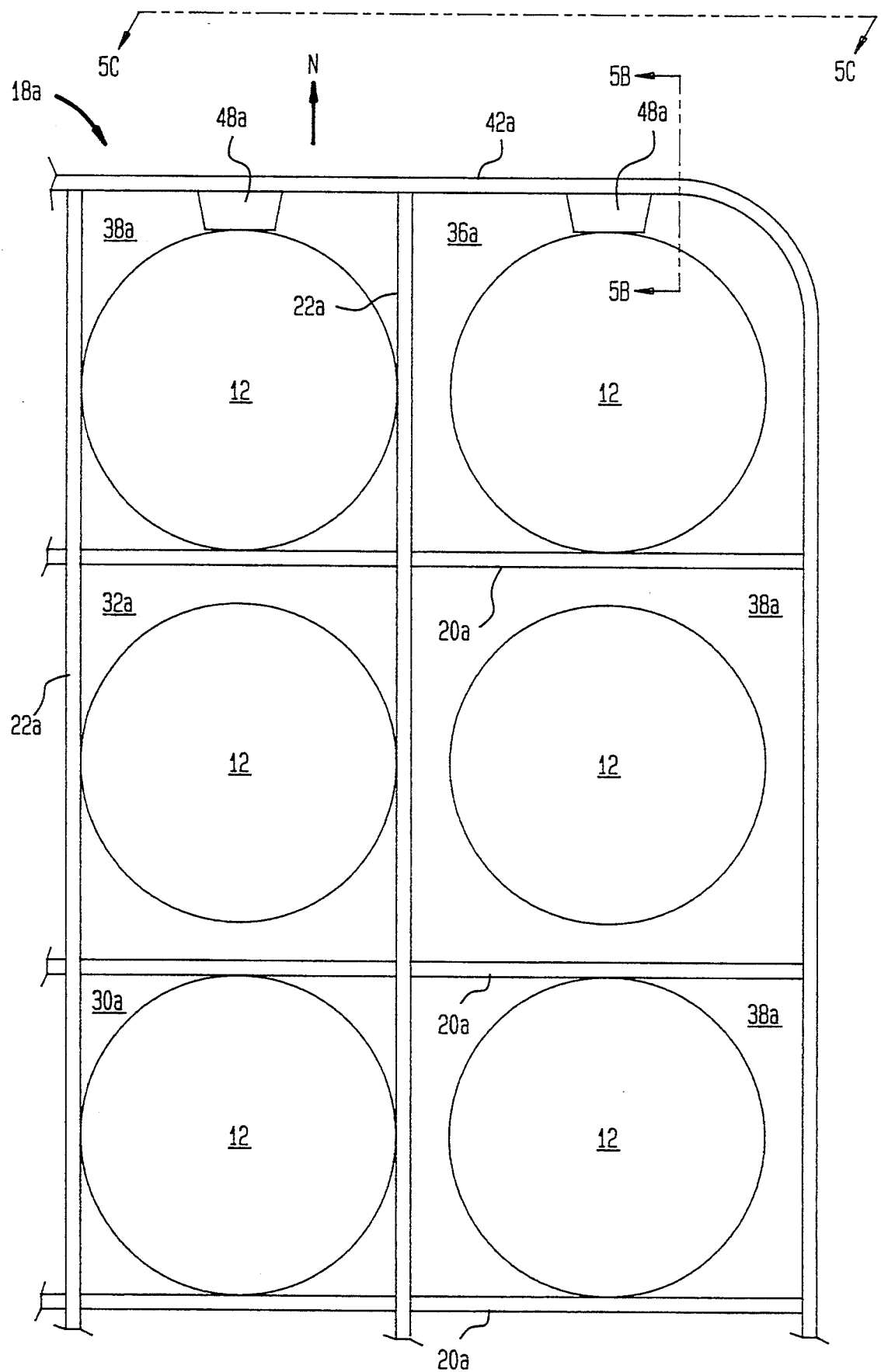
FIG. 5a is a top view taken along line 5a—5a of FIG. 2 showing a portion of the upper grid structure including a corner fuel rod support cell and peripheral fuel rod support cells.
Figure 5B:
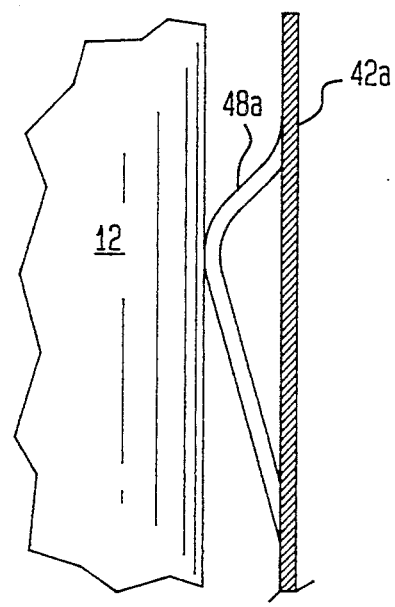
Figure 5C:
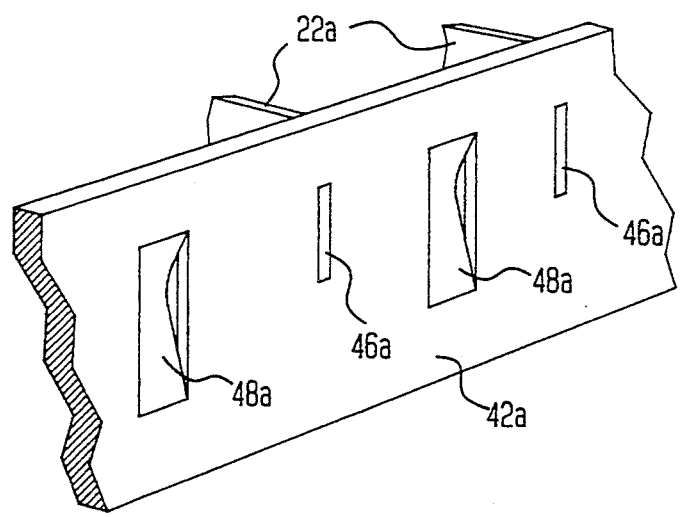
FIG. 5c is a side view of a portion of the perimeter strip extending around the perimeter of the upper grid structure.

Each of the four corner support cells 36a and half of the outermost or peripheral support cells 38a of upper spacer grid 18a have support dimples 48a formed in the peripheral strip 42a and which function to support the fuel rod in each of the corner support cells and peripheral support cells. As shown in FIG. 5a, each corner support cell 36a of upper grid structure 18a has one support dimple 48a opposing the grid strip which supports the fuel rod. The fuel rod in each corner cell 36a is thereby supported on two opposite sides. Half of the peripheral support cells 38a each has one support dimple 48a opposing strip 26a.

As stated above, lower grid structure 18b is mechanically identical to upper grid structure 18a. Each element of lower grid structure 18b is the same as each corresponding element in upper grid structure 18a. To distinguish each element of the upper grid structure from the lower grid structure, each element is given the same element number but is given the suffix "a" or "b" to designate whether the element is positioned in either the upper or lower grid structures, respectively. Spacer grid 18 is composed of lower grid structure 18b positioned parallel to upper grid structure 18a and oriented 90° relative to the lower grid structure 18b by rotating the lower grid structure 90° around an axis formed by inner water channel 44 (See FIGS. 2 and 3, and FIGS. 6a and 6b).

Each fuel rod 12 is supported by grid spacer 18 on four sides. Each one of a group of fuel rods within the interior portion of the fuel assembly passes through cell 30a in the upper grid structure 18a and cell 34b in lower grid structure 18b. These fuel rods are each supported within support cell 30a of upper grid structure 18a on four sides but are not supported within cell 34b in lower grid structure 18b. Each one of a second group of fuel rods is supported within support cell 32a of upper grid structure 18a on two opposite sides and is also supported on the two other opposite sides within support cell 32b of lower grid structure 18b. Each one of a third group of fuel rods which pass through cell 34a of upper grid structure 18a is supported on four sides within support cell 30b of lower grid structure 18b.

As in the case of each corner support cell 36a of upper grid structure 18a, each of the corner support cells 36b in lower grid structure 18b has a support dimple 48b opposite the grid strip supporting the fuel rod within the corner cell. The fuel rod in each corner of the fuel assembly is supported on four sides by both dimples 48a and 48b and the grid strips 20a and 20b of the upper and lower grid structures. As in the case of each peripheral cell 38a of the upper grid structure 18a, each of the peripheral support cells 38b in the lower grid structure 18b has one support dimple opposing the grid strip supporting the fuel rod within the peripheral cell. The fuel rod in each peripheral cell position in the fuel assembly is supported on four sides by one dimple in the perimeter strip, together with either two parallel grid strips of one grid structure (e.g. upper grid structure) and one grid strip of the second (e.g. lower) grid structure, or three intersecting grid strips of one grid structure. (See FIG. 6c).

FIG. 6b is a sectional view of the fuel assembly shown in FIG. 1 taken along lines 6b—6b showing lower grid structure 18b with most of the fuel rods removed for clarity of illustration. Each fuel rod passes through a cell in lower grid structure 18b. Those fuel rods which extend through cell 34a of upper grid structure 18a are supported on four sides by fuel rod support cell 30b of lower grid structure 18b. Similarly, the fuel rods which extend through and are supported on two sides by fuel rod support cell 32a of upper grid structure extend through and are supported on two opposite sides by fuel rod support cell 32b of the lower grid structure 18b. And, the fuel rods which extend unsupported through cell 34a of upper grid structure 18a extend through and are supported on four sides by fuel rod support cell 30b of lower grid structure 18b.

The superposition of the cells in upper grid structure 18a and of the cells in lower grid structure 18b is shown in the sectional view in FIG. 6c. Each fuel rod of the assembly is supported on each of four sides. The support on the four sides of each fuel rod is provided by either (a) a fuel rod support cell 30a in the upper grid structure; or (b) a fuel rod support cell 30b in the lower grid structure; or (c) a fuel rod support cell 32a in the upper grid structure together with a fuel rod support cell 32b in the lower grid structure; or (d) a corner fuel rod support cell 36a of the upper grid structure 18a together with a corner fuel rod support cell 38b of the lower grid structure 18b; or (e) a peripheral fuel rod support cell 38a of the upper grid structure together with a peripheral fuel rod support cell of the lower grid structure.

FIG. 6d is a perspective view of spacer 18 showing the support of three fuel rods by (1) support cell 30a of the upper spacer grid 18a; (2) support cells 32a and 32b; and (3) support cell 30b of the lower spacer grid 18b.

Figure 7:
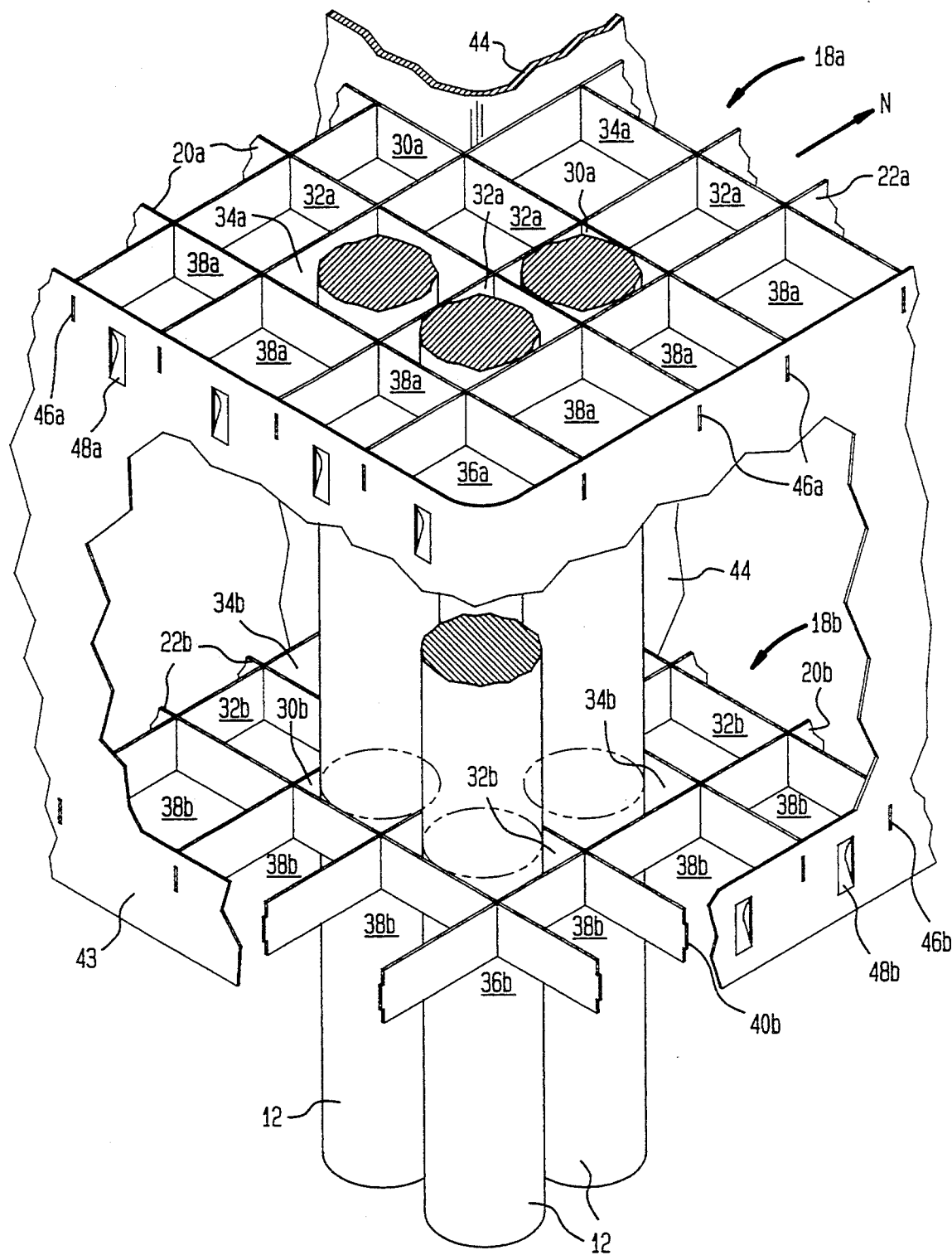
FIG. 7 is a perspective view of a first alternative embodiment of the spacer grid having a single common outer perimeter strip joining the upper and lower grid structures.
Figure 8:
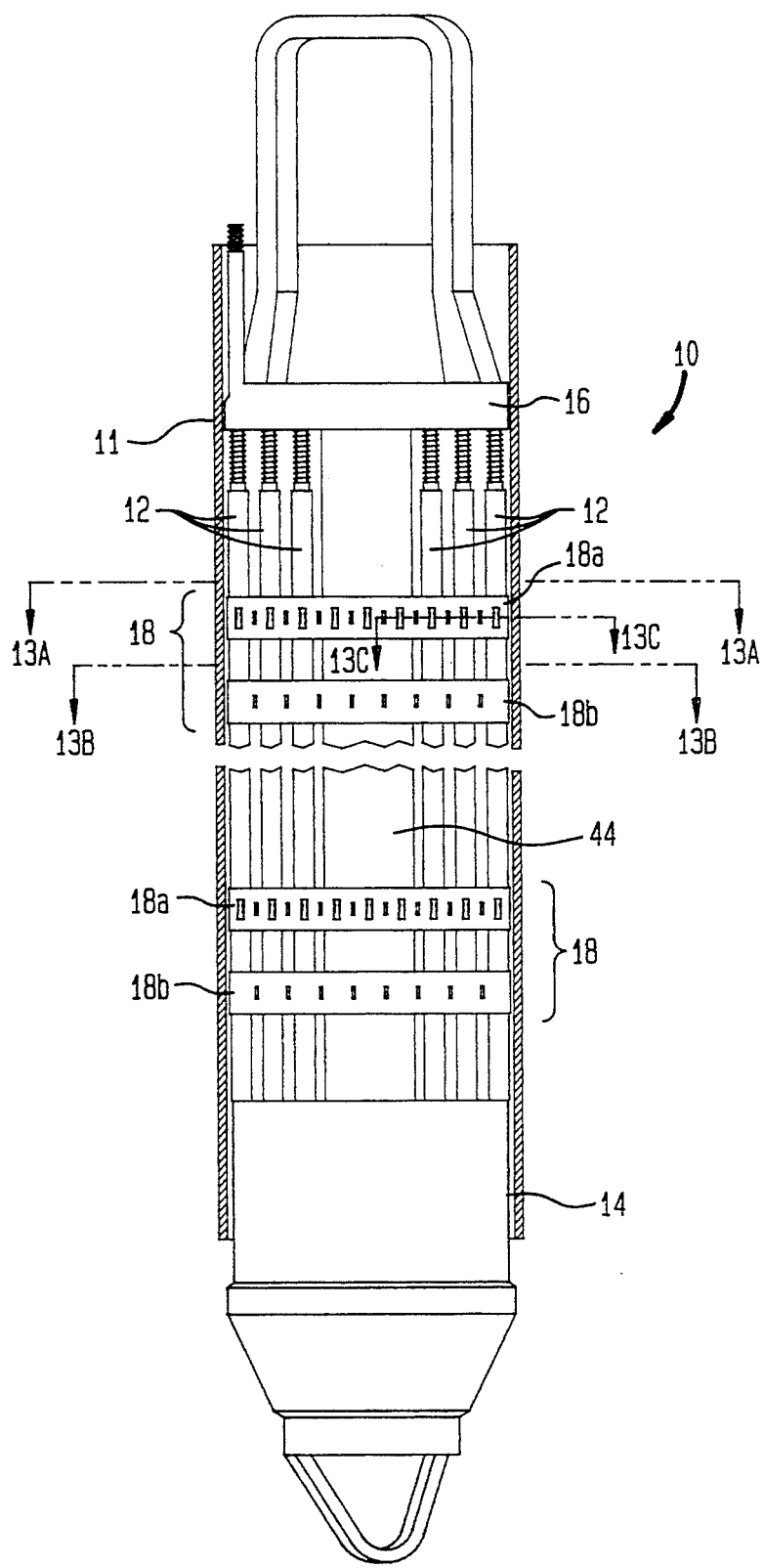
FIG. 8 is a sectional view along the length of a boiling water reactor fuel assembly employing a second alternative embodiment of the spacer of the present invention.
Figure 9:
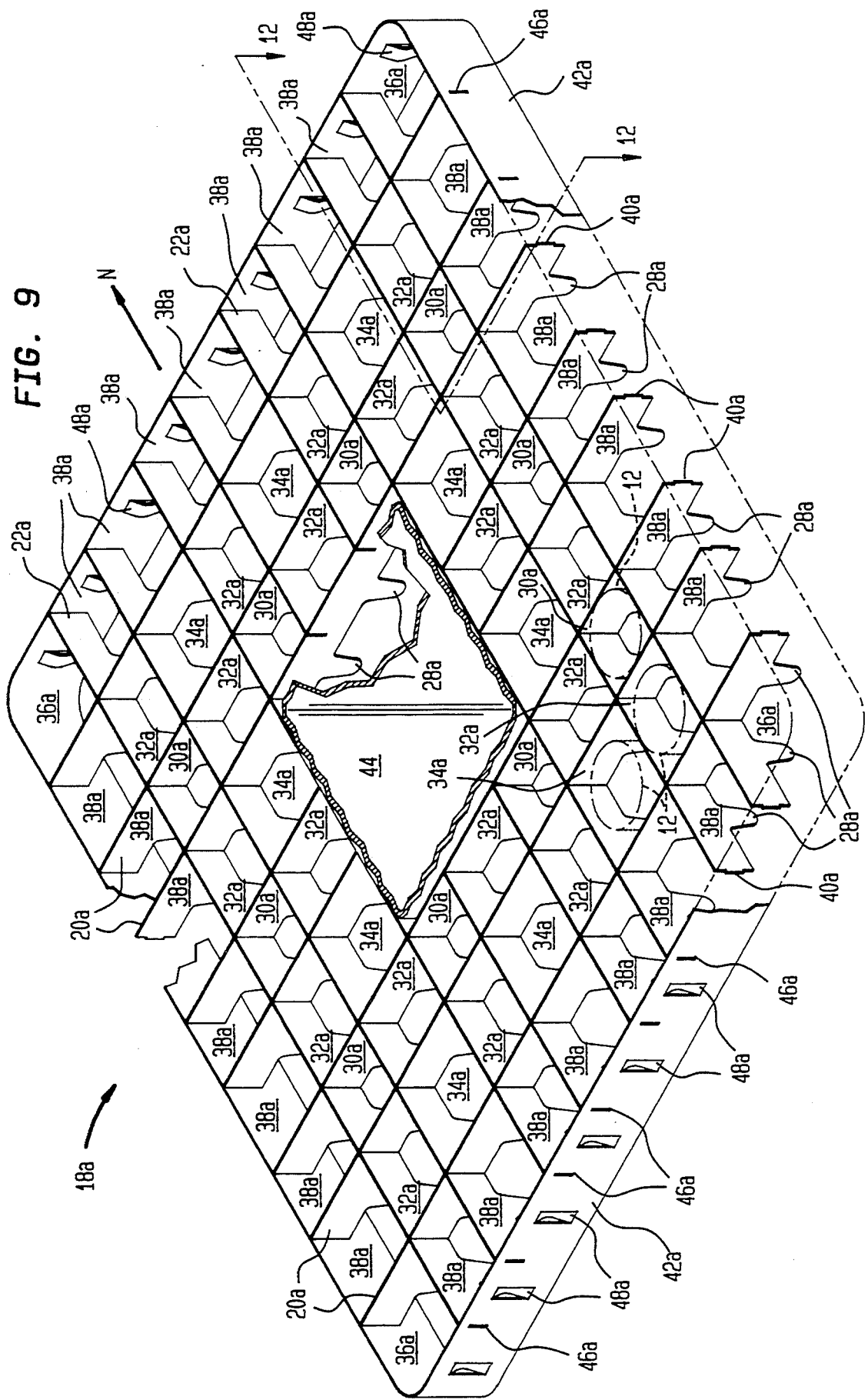
FIG. 9 is a perspective fragmentary view looking down upon the alternative spacer assembly shown in FIG. 8 showing the upper grid structure which includes cantilever spring tabs for providing further support to the fuel rods.
Figure 13A:
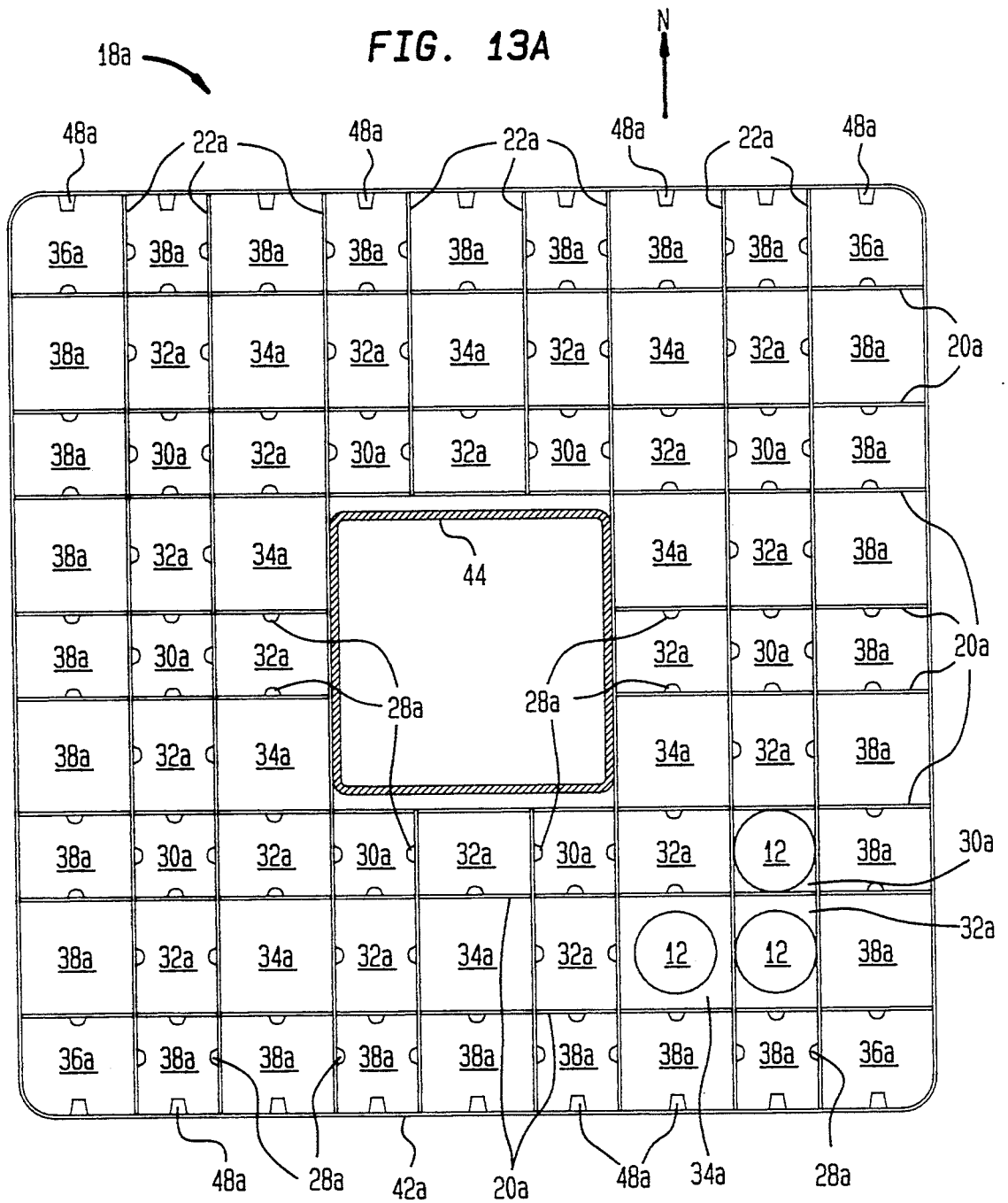
FIG. 13a is a sectional view taken along line 13a—13a of the alternative embodiment in FIG. 8 showing the upper grid structure.
Figure 13D:
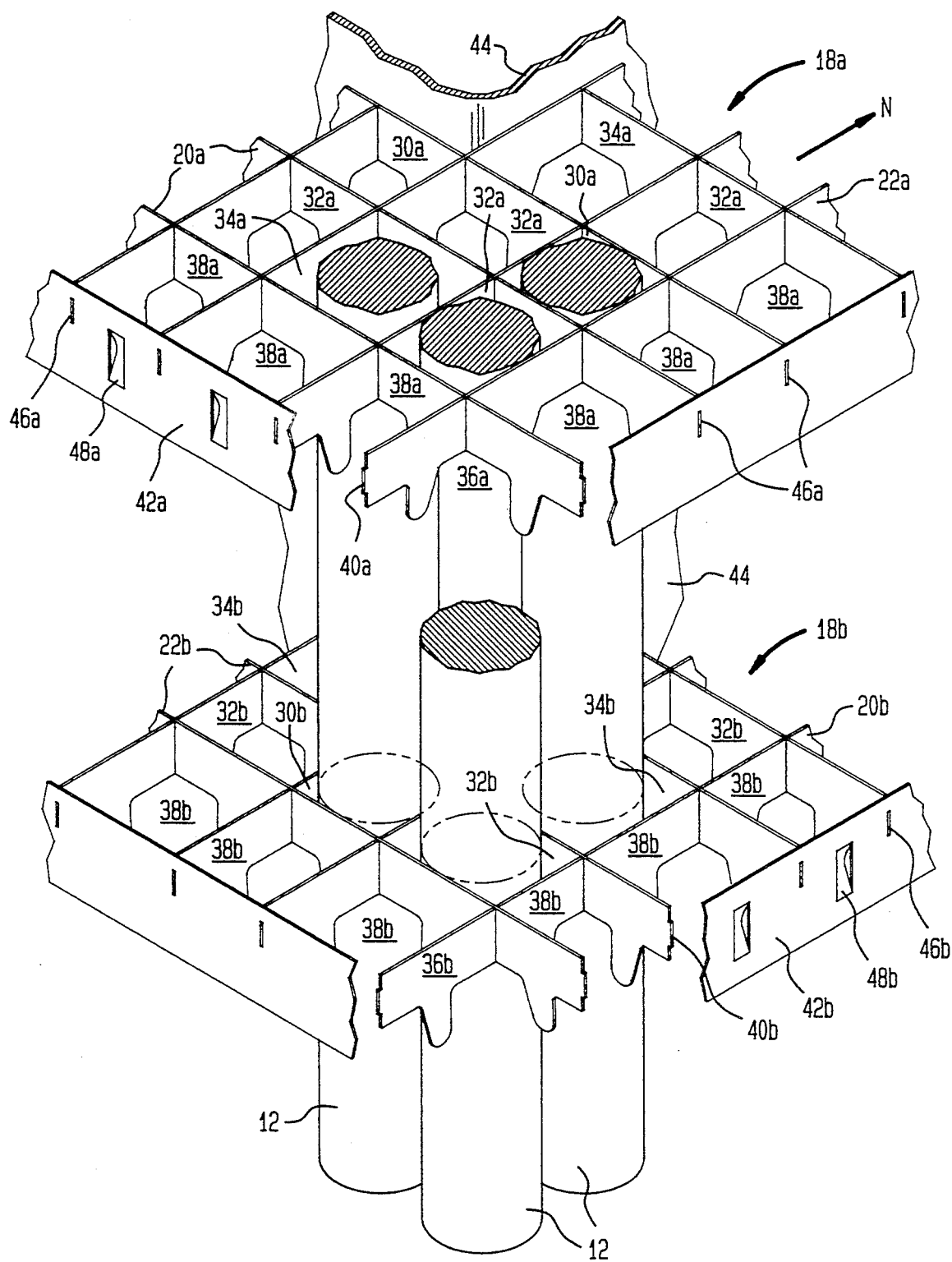
FIG. 13d is a perspective view of the alternative embodiment in FIG. 8 showing the support of several fuel rods by the fuel rod support cells and cantilevered tabs in both the upper and lower grid structures.

In an alternative embodiment, a common perimeter strip 43 replaces perimeter strips 42a and 42b. The upper grid structure and the lower grid structure are joined together by common perimeter strip 43 which extends vertically from the upper grid structure to the lower grid structure as shown in FIG. 7. Each of the four corner fuel rod support cells has two support dimples 48a and 48b respectively, formed from the common perimeter strip 43 to support each of the corner fuel rods. Half of the perimeter fuel rod support cells 36a and half of the perimeter fuel rod support cells 36b each has one dimple 48a, 48b respectively, formed from the common perimeter strip 43 to support each of the fuel rods in the perimeter cells.

In the embodiment shown in FIGS. 1–6D, the two grid structures i.e. upper grid structure 18a and lower grid structure 18b are not connected together. Grid spacers should not be allowed to rotate significantly with respect to the axes of the fuel rods, lest damage to the fuel rods or spacers result. Such rotation can result from differential axial growth of fuel rods or during handling of the fuel assembly. Spacers which have their points of contact with fuel rods on two widely spaced planes (normal to the axes of the fuel rods) are generally resistant to such rotation. The separate grid structures 18a and 18b of the embodiment shown in FIGS. 1–6D have no such resistance, but are however connected to inner water channel 44 to prevent such rotation. By joining the two grid structures by common perimeter strip 43 into a common structure, the present alternative embodiment shown in FIG. 7 avoids this requirement by providing fuel rod contact on two widely spaced planes, allowing either direct attachment to or sliding contact between the spacer grid and water channel.

In a further alternative embodiment (FIGS. 8–13D), cantilevered spring tabs 28a and 28b provide additional lateral support to the fuel rods within all fuel rod support cells to resist in-service vibration which may result due to creep down of the fuel rods and/or relaxation of strips 20a and 22a. Such vibration can contribute to fuel rod fretting and premature withdrawal from service. Although all of the cells which are fuel rod support cells have an internal dimension which is the same as the outside diameter of the fuel rod and which enables the fuel rod support cells to contact and support the fuel rod, cantilevered spring tabs have a much lower spring constant than that of the grid strips. In their unloaded position, each spring tab 28a, 28b is positioned and angled into the fuel rod support cells as shown in FIGS. 11b and 11d. Spring tabs 28a are formed from and contoured at an angle $\alpha$ to the body 21a of strip 20a and to the body 23a of strip 22a. Cantilevered spring tabs 28 are pushed into a straight position by the placement of a fuel rod into the fuel rod support cells as shown in FIGS. 11e and 11f. Each spring tab 28a vertically aligns with the grid strip from which it extends thereby presenting virtually no "shadow" or profile resistance and minimal restrictions to the flow of coolant/moderator.

Reduced hydraulic resistance of spacer 18 is further enhanced by making grid strips, cantilever spring tabs and perimeter strip(s) of a thin material. The use of a thin material in conjunction with the above described configuration of spacer 18 offers minimum projected area to coolant/moderator flow. Materials of construction include a heat treatable nickel alloy, stainless steel, or zirconium alloy. It is preferred that the grid spacers 18 be fabricated from a heat treatable nickel alloy having high elastic modulus and yield strength at reactor operating temperature and would be of a thickness of approximately 10 mils. An example is Inconel and preferably Inconel 718 which is described by Society of Automotive Engineer's Aerospace Material Specification No. 5596, Revision C, November 1968, which is hereby incorporated by reference.

Spacer assemblies must be capable of withstanding lateral or transverse loads that may occur during postulated seismic events. Such loading will typically result in localized buckling (i.e. Euler column buckling) of the spacer strip components between intersection welds or joints. Following such a postulated event, spacing between fuel rods which is maintained by the spacer must not be reduced to the point that coolant cannot pass freely between them.

In addition to resisting such loads, the present invention has a very high strength to weight ratio. Grid strips 20, 22 of spacer grid 18 are all straight, without undulations, and have no interruptions between their intersection points. As a result, neither the eccentric column effect nor stress risers occur in spacer grid 18 of the present invention. In addition, increased strength in the area where buckling might otherwise be expected to occur according to column buckling theory is provided by the cantilevered spring tabs of the third embodiment of the present invention. Prior art spacers create eccentricity and or stress risers because of the reliance upon the use of conventional dimples and spring slots to support the fuel rods. Lastly, Inconel, a preferred heat treated high nickel alloy, has a very high elastic modulus and yield strength at reactor operating temperatures, giving the spacer of the present invention high column buckling resistance.

In addition to the above-described advantages over prior art spacers, the fabrication cost of the spacer grid of the present invention is lower because: (a) separate springs are not used; (b) a very small number of different part types are used; (c) each of the parts can be made by simple, thus low cost, stamping and forming tooling; and (d) the use of straight strips allows fuel rod to rod spacing to be controlled solely by the accuracy of intersection slot spacing which is very easy to control and which results in very low cost of inspection of the finished spacer assembly.

While the foregoing description and drawings represent the preferred embodiments of the present invention, it will be apparent to those skilled in the art that various changes and modifications may be made therein without departing from the true spirit and scope of the present invention.

What is claimed:

1. A nuclear fuel assembly for boiling water reactors, the assembly having a plurality of elongated fuel rods supported between a lower tie plate positioned toward the bottom of the assembly and an upper tie plate positioned toward the top of the assembly;
   an outer channel surrounding the plurality of fuel rods for conducting coolant/moderator about the fuel rods from the bottom of the assembly toward the top of the assembly;
   an inner water channel having at least one wall for conducting coolant/moderator therethrough from the bottom of the assembly toward the top of the assembly;
   at least one spacer for positioning and retaining the fuel rods, the spacer comprising:
   an upper grid structure and a lower grid structure, each of the lower grid structure and the upper grid structure comprises;
   (a) a first set of flat substantially straight parallel grid strips;
   (b) a second set of flat substantially straight parallel grid strips which intersect the first set of grid strips to form in each of the upper grid structure and the lower grid structure a lattice of rectangular and square shaped cells through which the fuel rods extend and which act against said fuel rods within the cells, in the lattice in each of the upper grid structure and the lower grid structure being the same;
   (c) a perimeter strip which extends around the perimeter of the intersecting first and second grid strips, the first grid strips and the second grid strips being secured to the perimeter strip, the perimeter strip having a plurality of dimples;
   the lower grid structure and upper grid structure being positioned parallel to one another and oriented substantially 90° relative to one another so that each of the rectangular and square shaped cells in the upper grid structure is superimposed on a corresponding one of the rectangular and square shaped cells in the lower grid structure so as to act cooperatively against and provide support to a nuclear fuel rod positioned in the cell in the upper grid structure and in the corresponding cell in the lower grid structure on four sides of the nuclear fuel rod.

2. The assembly as in claim 1 wherein the first set of grid strips have notches and the second set of grid strips have corresponding matching notches which interfit to form the lattice of rectangular and square shaped cells through which the fuel rods extend.

3. The assembly as in claim 2 wherein at least one of the first set of grid strips has a prong at an end which connects into a matching recess in the perimeter strip.

4. The assembly as in claim 1 wherein the spacer is of a material selected from the group of metals consisting of stainless steel, zirconium alloy, and nickel alloy.

5. The assembly as in claim 4 wherein the nickel alloy is Inconel.

6. The assembly as in claim 4 wherein the nickel alloy is heat treatable nickel alloy having high elastic modulus and yield strength at reactor operating temperature.

7. The assembly as in claim 1 wherein the grid strips has a thickness of approximately 10 mils.

8. A nuclear fuel assembly for boiling water reactors, the assembly having a plurality of elongated fuel rods supported between a lower tie plate positioned toward the bottom of the assembly and an upper tie plate positioned toward the top of the assembly;
   an outer channel surrounding the plurality of fuel rods for conducting coolant/moderator about the fuel rods from the bottom of the assembly toward the top of the assembly;
   an inner water channel having at least one wall for conducting coolant/moderator therethrough from the bottom of the assembly toward the top of the assembly;
   at least one spacer for positioning and retaining the fuel rods, the spacer comprising:
   an upper grid structure and a lower grid structure, each of the lower grid structure and the upper grid structure comprises;
   (a) a first set of flat substantially straight parallel grid strips;
   (b) a second set of flat substantially straight parallel grid strips which intersect the first set of grid strips to form in each of the upper grid structure and the lower grid structure a lattice of rectangular and square shaped cells through which the fuel rods extend and which act against said fuel rods within the cells, the lattice in each of the Upper grid structure and the lower grid structure being the same;
   the spacer further comprising a common perimeter strip which extends around the perimeter of and secured to the grid strips forming the upper grid structure and extends around the perimeter of and secured to the grid strips forming the lower grid structure;
   the lower grid structure and upper grid structure being positioned parallel to one another and oriented substantially 90° relative to one another so that each of the rectangular and square shaped cells in the upper grid structure is superimposed on a corresponding one of the rectangular and square shaped cells in the lower grid structure so as to act cooperatively against and provide support to a nuclear fuel rod positioned both in the cell in the upper grid structure and in the corresponding cell in the lower grid structure on four sides of the nuclear fuel rod.

9. The assembly as in claim 8 wherein the first set of grid strips have notches and the second set of grid strips have corresponding notches which interfit to form the lattice of rectangular and square shaped cells through which the fuel rods extend.

10. The assembly as in claim 9 wherein at least one of the first set of grid strips has a prong at an end which connects into a matching recess in the perimeter strip.

11. The assembly as in claim 8 wherein the spacer is of a material selected from the group of metals consisting of stainless steel, zirconium alloy, and nickel alloy.

12. The assembly as in claim 11 wherein the nickel alloy is Inconel.

13. The assembly as in claim 11 wherein the nickel alloy is heat treatable nickel alloy having high elastic modulus and yield strength at reactor operating temperature.

14. The assembly as in claim 8 wherein the grid strips has a thickness of approximately 10 mils.

15. A nuclear fuel assembly for boiling water reactors, the assembly having a plurality of elongated fuel rods supported between a lower tie plate positioned toward the bottom of the assembly and an upper tie plate positioned toward the top of the assembly;
- an outer channel surrounding the plurality of fuel rods for conducting coolant/moderator about the fuel rods from the bottom of the assembly toward the top of the assembly;
- an inner water channel for conducting coolant/moderator therethrough from the bottom of the assembly toward the top of the assembly;
- at least one spacer for positioning and retaining the fuel rods, the spacer comprising:
  - an upper grid structure and a lower grid structure, each of the lower grid structure and the upper grid structure comprises;
    - (a) a first set of flat substantially straight parallel grid strips;
    - (b) a second set of flat substantially straight parallel grid strips which intersect the first set of grid strips to form in each of the upper grid structure and the lower grid structure a lattice of rectangular and square shaped cells through which the fuel rods extend and which act against said fuel rods within the cells, the lattice in each of the upper grid structure and the lower grid structure being the same;
  - the spacer further comprising a common perimeter strip which extends around the perimeter of and secured to the grid strips forming the upper grid structure and extends around the perimeter of and secured to the grid strips forming the lower grid structure, the common perimeter strip having a plurality of dimples;
  - the lower grid structure and upper grid structure being positioned parallel to one another and oriented substantially 90° relative to one another so that each of the rectangular and square shaped cells in the upper grid structure is superimposed on a corresponding one of the rectangular and square shaped cells in the lower grid structure where a given grid strip from the group of first set of grids strips and the second set of grid strips provides support for the fuel rod within a selected cell, and said given grid strip is adapted to form a cantilevered spring tab for providing additional support within said selected cell.

16. The assembly as in claim 15 wherein the first set of grid strips have notches and the second set of grid strips have corresponding matching notches which interfit to form the lattice of rectangular and square shaped cells through which the fuel rods extend.

17. The assembly as in claim 16 wherein a grid strip of the first set of grid strips has a prong at an end which connects into a matching recess in the perimeter strip.

18. The assembly as in claim 15 wherein the spacer is of a material selected from the group of metals consisting of stainless steel, zirconium alloy, and nickel alloy.

19. The assembly as in claim 18 wherein the nickel alloy is Inconel.

20. The assembly as in claim 18 wherein the nickel alloy is heat treatable nickel alloy having high elastic modulus and yield strength at reactor operating temperature.

21. The assembly as in claim 15 wherein the grid strips has a thickness of approximately 10 mils.

22. The assembly as in claim 15 wherein the dimples are positioned on the perimeter strip opposite the given grid strip supporting the fuel rod within the selected cell.

* * * * *